United States Patent [15] 3,638,043
Laupman [45] Jan. 25, 1972

[54] CURRENT CONTROL DEVICE

[72] Inventor: Robert Ronald Laupman, Wijchen, Netherlands

[73] Assignee: N. V. Auco, Wijchen, Netherlands

[22] Filed: Oct. 6, 1969

[21] Appl. No.: 863,891

[30] Foreign Application Priority Data

Oct. 9, 1968 Netherlands..................68/14,447

[52] U.S. Cl. .....................307/252 B, 307/252 N, 307/295, 307/305
[51] Int. Cl. .................................................H03k 17/00
[58] Field of Search ................307/252.21, 252.70, 305, 295

[56] References Cited

UNITED STATES PATENTS 2,871,305  1/1959  Hurtig.....................................307/293
3,335,291  8/1967  Gutzwiller..............................307/253
3,353,078  11/1967 Maynard................................307/252
3,443,124  5/1969  Pinckaers..............................307/305
3,513,332  5/1970  Snyder...................................307/252

Primary Examiner—Donald D. Forrer
Assistant Examiner—David M. Carter
Attorney—Diller, Brown, Ramik & Holt

[57] ABSTRACT

A device for controlling an electrical current through a load by means of a bilateral controlled rectifying element. Said element is fired periodically through a bilateral rectifier which in its turn receives a firing signal through a series capacitor included in the output circuit of a control amplifier, which at its input receives stimuli for firing said controlled rectifying element. Said series capacitor is effective to improve the symmetry of the waveform of the current through the load, while also the current control range is increased thereby.

16 Claims, 7 Drawing Figures

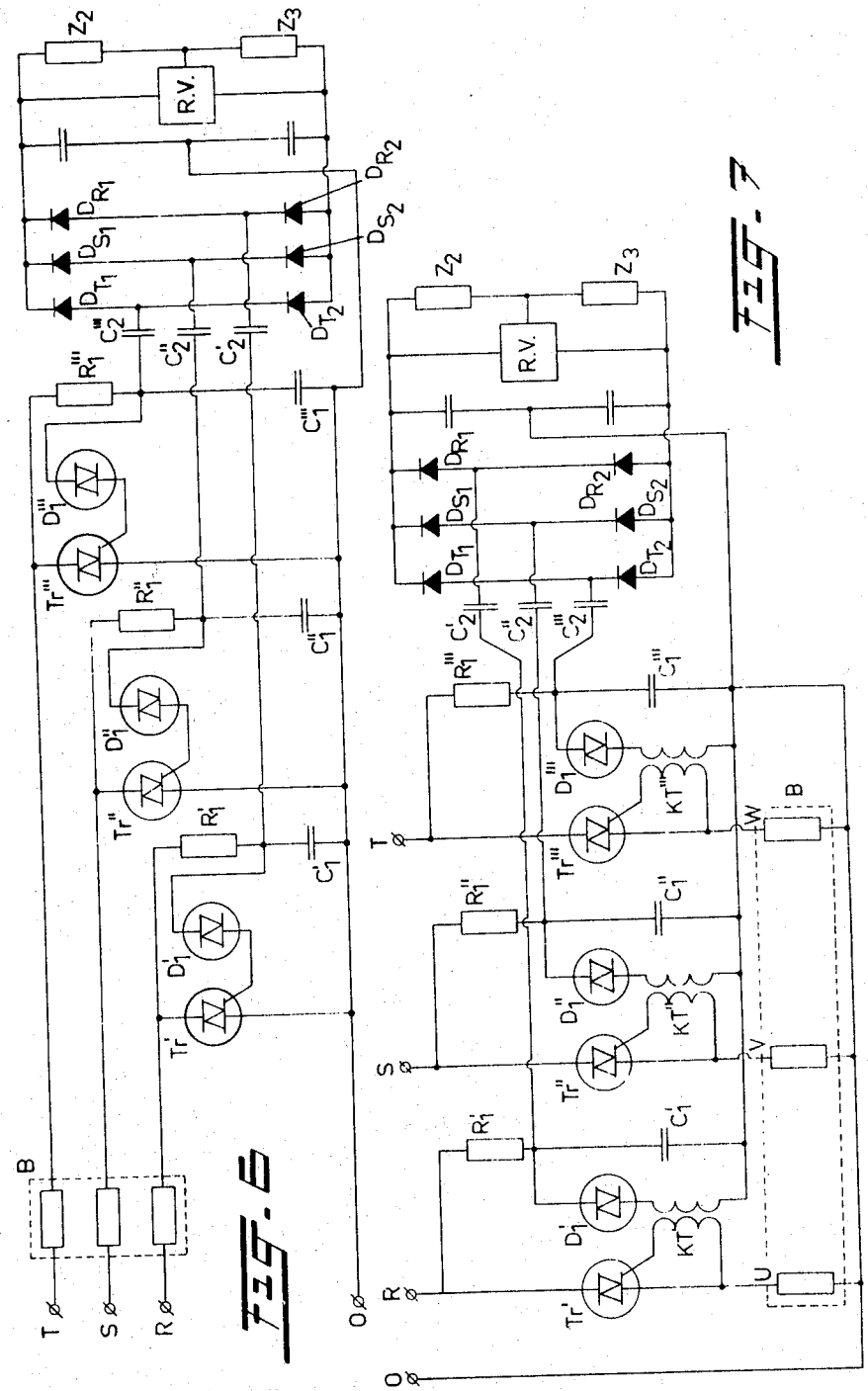

CURRENT CONTROL DEVICE

It is known to control the AC voltage generated across a load, using a triode semiconductor AC switching means, such as a triac, which is connected to the AC supply mains in series with the load. The gate electrode of the triode semiconductor AC switching means in that case connected through a diode semiconductor AC switching means, such as a diac, with the nodal point of a series circuit formed by a variable resistor and a capacitor, which series circuit is connected in parallel with the triode semiconductor AC switching means, or triac.

Figure 1:
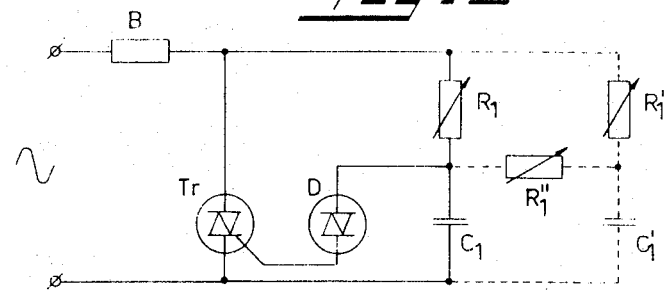

There are a good many drawbacks inherent in such a relatively simple circuit, which is shown diagrammatically in FIG. 1, such as: a hysteresis effect, partly caused by the properties of capacitor C1; asymmetry in the cutoff sine halves of the voltage waveform owing to asymmetry in the characteristic of the diode AC switching means; the necessity of a variable resistor (the voltage divider R1) adapted to permit the passage of a relatively strong current and across which a relatively high voltage is produced, so that such a resistor must be of excellent quality. To obviate the first-mentioned drawback, circuits of the above-known type have been designed in accordance with likewise known proposals, as shown in FIG. 1 by the dashed lines.

In addition to the above drawbacks this circuit has the serious drawback that is is actually unsuitable for controlling purposes, for instance using a light-sensitive resistor (LDR-resistor), a temperature-sensitive resistor (NTC-resistor), or like elements, on account of the extremely low sensitivity.

The object of the invention is to provide the simplest possible solution for all the above drawbacks. Thus it is even possible to simply introduce a delay by means of which it is possible to entirely suppress current pulses owing to for instance the occurrence of relatively rapid voltage variations in an inductive load.

The invention is particularly applicable to cases in which the load is a DC motor connected in a diode bridge circuit. In that case, if the motor is inoperative and the supply mains is suddenly switched on, while the control voltage divider is adjusted for the maximum speed, relatively strong currents may flow which only reach their normal value when the motor and the transmission means connected therewith have reached their final speed.

Such a situation arises when the dividing ratio of the control voltage divider is varied at relatively high speed.

A properly dimensioned voltage generated with delay across the load will in this case save the motor (commutator), drive mechanism (gearbox) and control means (peak currents).

FIG. 1 is prior art. FIGS. 2–7 are embodiments of the invention.

Figure 2:
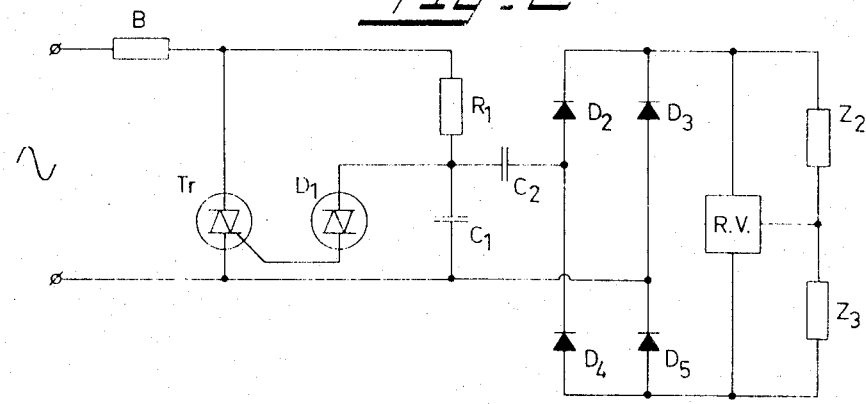

An embodiment of a circuit according to the invention is shown in FIG. 2. A series circuit comprising a load B and a triode semiconductor AC current switching means $T_R$ is connected across the supply mains. A series circuit formed by a resistor $R_1$ and a capacitor $C_1$ is connected in parallel with this switching means $T_R$. The nodal point of this resistor $R_1$ and capacitor $C_1$ is connected through a diode AC switching means $D_1$ with the gate electrode of the switching means $T_R$. The AC voltage input of a bridge circuit comprising diodes $D_2$–$D_5$ is connected through capacitor $C_2$ across capacitor $C_1$.

A control amplifier RV is connected with the DC voltage terminals of this bridge circuit. The control input of this control amplifier is connected with the tap of a voltage divider formed by two impedances $Z_2$ and $Z_3$, the ends of which voltage divider are also connected with the DC voltage terminals of the bridge circuit.

When properly dimensioning the component parts and by varying the voltage divider formed by the impedances $Z_2$ and $Z_3$ it is possible to form a control range wherein the voltage generated across the load can be controlled from zero to a maximum value. The capacitor $C_2$ is essential in the sense that owing to the presence of this capacitor relatively small cutoff angles of the voltage waveform can be realized too. If there should be a difference between the cutoff angles of successive sine halves, a magnitude characteristic of such a difference can be found in the form of a residual voltage on capacitor $C_2$, whose capacitance is higher than that of capacitor $C_1$. Such a residual voltage then forms a control voltage which is active in the next sine half to compensate for this difference.

Figure 3:
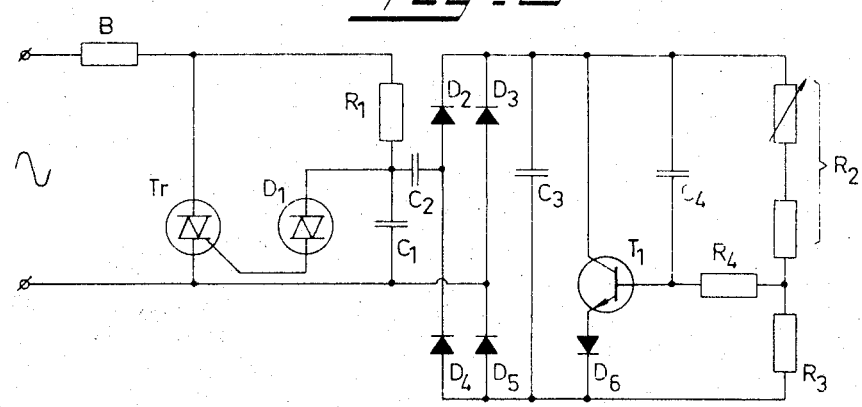

The embodiment of FIG. 2 is shown in greater detail in FIG. 3, in which the control amplifier RV is designed simplest in the form of an amplifier provided with a transistor $T_1$. In the circuit shown in FIG. 3, a diode or a Zener diode $D_6$ has been connected in series with the emitter of the transistor $T_1$ of the control amplifier RV, in order to obtain an improvement of the control effect. If for example the resistor $R_3$ of this circuit is replaced by an NTC-resistor, or if the resistor $R_2$ is fully or partly replaced by a light-sensitive resistor, it appears that taking into account the simplicity of the device, unexpectedly high sensitivities are obtained. By connecting a resistor $R_4$ between the base of the transistor $T_1$ and the node of resistor $R_3$ it is possible to influence the control characteristic, which is often desirable in nonlinear transducers such as NTC-resistors.

By connecting a capacitor $C_4$ between the base and the collector of transistor $T_1$, a delay is simply introduced in the sense that in case of a rapid variation of the resistor $R_2$ the control effect of transistor $T_1$ is delayed by said capacitor $C_4$. It appears to be possible to realize a delay in the order of magnitude of some seconds, with an order of magnitude of some microfarads for the capacitance of this capacitor $C_4$.

In order that this capacitor $C_4$ does not discharge during and adjacent the zero places of the sine wave, a capacitor $C_3$ may be connected across the DC voltage terminals of the bridge circuit with diodes $D_2$–$D_5$, which capacitor keeps the voltage constant during these periods.

As a matter of course it is possible to utilize in the circuit according to the invention more complicated control amplifiers having one or more control or logic inputs of higher sensitivity.

Figure 4:
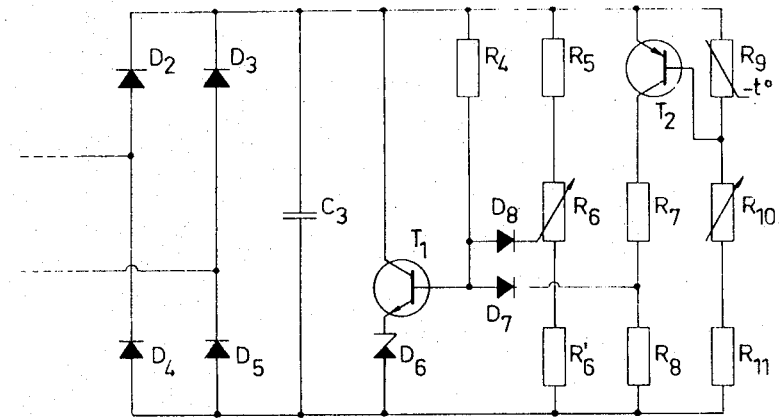

FIG. 4 shows a variant of the circuits shown in FIGS. 2 and 3, more particularly a variant of the section of the circuit to the right of capacitor $C_2$. In the embodiment shown in FIG. 4 the control amplifier with transistor $T_1$ is formed with one input circuit having a diode $D_7$ and a second input circuit having a diode $D_8$. The input circuit having the diode $D_7$ is coupled with a temperature-sensitive circuit with a transistor $T_2$ and an NTC-resistor $R_9$. The input circuit having the diode $D_8$ is coupled with a voltage divider formed by the resistors $R_5$, $R_6$ and $R_6$', with which a minimum value can be adjusted at choice. The controlling effect of transistor $T_1$ is always determined by either of the two voltages applied on the cathode side of the diodes $D_7$ and $D_8$ in question, that is the voltage which is the lower under the circumstances.

Figure 5:
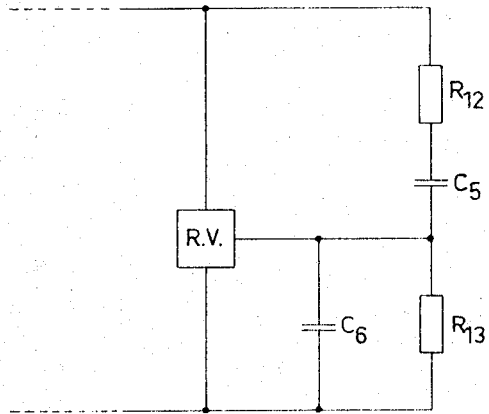

In the embodiment as shown in FIG. 2 the impedances $Z_2$ and $Z_3$ of the voltage divider may take different forms. Not only are these impedances $Z_2$ and $Z_3$ formed as resistors, but the impedance $Z_2$ may for example be a capacitor and resistor connected in parallel. FIG. 5 shows an alternative embodiment in which the impedance $Z_2$ comprises a series circuit formed by a resistor $R_{12}$ and a capacitor $C_5$, while impedance $Z_3$ is formed by a resistor $R_{13}$ and a capacitor $C_6$ connected in parallel. With the embodiment shown in FIG. 5 it is possible to dimension the component parts in such a manner that the load is intermittently connected to the voltage, to allow for a cycle duration of some seconds.

FIG. 6 shows an embodiment in which the present invention has been applied in the event that the load is adapted for connection to a three-phase supply mains R, S, T. The characters designating parts corresponding with the embodiments shown in FIGS. 2 and 3 are for each phase provided with apostrophes in the embodiment shown in FIG. 6, while the bridge circuit with the diodes $D_{T1}$–$D_{R2}$ is adapted to the three-phase system. The embodiment of FIG. 6 has the advantage that there may be a simple coupling between the phases, so that the device can be realized in a simple manner and with relatively few parts.

FIG. 7 shows a variant of the circuit shown in FIG. 6. This variant is particularly suitable for those cases where of the three-phase load only the star point is accessible for external connection. In this case, however, it is necessary to provide for each phase a galvanic separation between the diac and triac in question, so that the firing energy is then transmitted through an associated coupling transformer KT'–KT'''.

I claim:

1. A current control device comprising an alternating current thyristor having a control electrode and two current-carrying electrodes; means for connecting said two current-carrying electrodes in series with a load to an alternating current supply; a RC circuit connected in parallel with said two current carrying electrodes; an alternating current diode having first and second electrodes coupled between said control electrode and a point on said RC circuit; a capacitance means; a rectifying circuit having two input terminals and two output terminals, said capacitance means being coupled between one of said input terminals of said rectifying circuit and said point on said RC circuit, and the other of said input terminals of said rectifying circuit being coupled to one of the current-carrying electrodes of said alternating current thyristor; a control amplifier having a control electrode and two main electrodes, said two main electrodes being coupled across the two output terminals of said rectifying circuit; and a condition-sensing voltage divider means for developing a control signal at a tap thereon, said tap being coupled to the control electrode of said control amplifier.

2. A current control device according to claim 1 wherein said condition-sensing voltage divider means is coupled across said output terminals of said rectifying circuit.

3. A current control device according to claim 1 wherein said control amplifier comprises a transistor amplifier having a collector electrode, an emitter electrode and a base electrode, and a resistance means is coupled between the base electrode of said transistor and said tap on the condition-sensing voltage divider means.

4. A current control device according to claim 3 including a diode means coupled between said emitter electrode and one of the output terminals of said rectifying circuit.

5. A current control device according to claim 3 including a capacitive means coupled between said collector electrode and said base electrode.

6. A current control device according to claim 4 including a capacitive means coupled between said collector electrode and said base electrode.

7. A current control device according to claim 3 wherein a capacitive means is coupled between said collector electrode and said emitter electrode.

8. A current control device according to claim 4 wherein a capacitive means is coupled between said collector electrode and said emitter electrode.

9. A current control device according to claim 5 wherein a capacitive means is coupled between said collector electrode and said emitter electrode.

10. A current control device according to claim 6 wherein a capacitive means is coupled between said collector electrode and said emitter electrode.

11. A current control device according to claim 1 wherein said control electrode of said control amplifier is coupled to a terminal of each of a plurality of diodes, the other terminal of each of said plurality of diodes being coupled to points on said condition-sensing voltage divider means.

12. A current device according to claim 1 comprising a plurality of alternating current thyristors each having a control electrode and two current carrying electrodes; a plurality of means for connecting each said two current carrying electrodes in series with respective loads to respective different phases of an alternating current supply; a plurality of RC circuits connected respectively in parallel with each respective said two current-carrying electrodes; a plurality of alternating current diodes each having first and second electrodes coupled respectively between one of said control electrodes and a point on a respective one of said plurality of RC circuits; a plurality of capacitive means; a plurality of rectifying circuits each having two input terminals and two output terminals, each of said plurality of capacitive means being coupled respectively between one of said input terminals of one of said plurality of rectifying circuits and the said point on respective ones of said plurality of RC circuits; and means for coupling the two output terminals of each of said plurality of rectifying circuits across the two main electrodes of said control amplifier.

13. A current control device according to claim 12 wherein each of the respective loads has a first terminal connected to a respective one of said two current-carrying electrodes of each of said plurality of alternating current thyristors, respectively; each of the respective loads has a second terminal connected in common with the second terminals of all other loads to define a star point; and each of said plurality of alternating current diodes is connected with individual magnetic coupling means coupled respectively between one of said current-carrying electrodes and the control electrode of each of said plurality of alternating current thyristors.

14. A current control device according to claim 12 wherein said condition-sensing voltage divider means is coupled across said two output terminals of each of said plurality of rectifying circuits.

15. A current control device according to claim 13 wherein said condition-sensing voltage divider means is coupled across said two output terminals of each of said plurality of rectifying circuits.

16. A current control device according to claim 4 wherein said diode means is a Zener diode.

* * * * *